(12) United States Patent
Abou-Assaad et al.

(10) Patent No.: US 11,271,381 B2
(45) Date of Patent: Mar. 8, 2022

(54) SYSTEMS AND METHODS FOR SUBSEA WIRING SPLICES

(71) Applicant: Baker Hughes Oilfield Operations LLC, Houston, TX (US)

(72) Inventors: Amine Abou-Assaad, Houston, TX (US); James T Richeson, Houston, TX (US); Alexander McAuley, Houston, TX (US); John S Holmes, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/577,393

(22) Filed: Sep. 20, 2019

(65) Prior Publication Data
US 2021/0091550 A1 Mar. 25, 2021

(51) Int. Cl.
*H02G 3/08* (2006.01)
*H02G 1/10* (2006.01)
*E21B 17/02* (2006.01)

(52) U.S. Cl.
CPC .......... *H02G 3/088* (2013.01); *E21B 17/028* (2013.01); *H02G 1/10* (2013.01); *H02G 3/083* (2013.01)

(58) Field of Classification Search
CPC .......... H02G 3/088; H02G 15/14; H02G 1/10; H02G 15/013; H02G 15/06; H02G 15/068; H02G 15/105; H02G 3/0666; H02G 3/0683; H02G 3/22; H02G 9/00; H01L 37/14; E21B 33/043; E21B 33/038; E21B 33/13; E21B 33/14; E21B 33/16; E21B 33/035; E21B 33/064; E21B 34/14; E21B 43/10; E21B 33/12; E21B 21/08; E21B 2200/05; E21B 34/10; E21B 23/00; E21B 33/143; E21B 47/12; E21B 21/001; E21B 21/10; E21B 23/01; E21B 33/04; E21B 34/04;
(Continued)

(56) References Cited

U.S. PATENT DOCUMENTS 2,927,150 A * 3/1960 Potter .................. H01R 11/18
174/74 R
3,431,621 A * 3/1969 Manning ............ H01R 43/0421
29/56.6
(Continued)

OTHER PUBLICATIONS

Erki et al., "Anchorages for FRP," Jun. 1993, Concrete International, pp. 54-59.
(Continued)

*Primary Examiner* — William H. Mayo, III
*Assistant Examiner* — Krystal Robinson
(74) *Attorney, Agent, or Firm* — Hogan Lovells US LLP

(57) ABSTRACT

A subsea wiring apparatus includes a housing having a cavity extending from a first end to a second end. The apparatus also includes an electrical connector arranged within the cavity, the electrical connector receiving at least one conductor. The apparatus further includes a separator extending at least partially into the cavity, wherein the separator receives the at least one conductor and directs the at least one conductor into a passage. The apparatus also includes an isolating material within the cavity, the isolating material extending from the first end to the second end, wherein the isolating material surrounds at least a portion of the conductor to block fluid communication with the conductor.

20 Claims, 4 Drawing Sheets

(58) Field of Classification Search
CPC ...... E21B 34/06; E21B 17/01; E21B 33/0355;
E21B 33/076; E21B 33/085; E21B
19/002; E21B 19/16; E21B 7/12; E21B
17/04; E21B 19/006; E21B 2200/06;
E21B 33/0422; E21B 34/102; E21B
41/10; E21B 47/092; E21B 17/00; E21B
17/07; E21B 19/06; E21B 19/07; E21B
21/103; E21B 21/106; E21B 23/06; E21B
31/20; E21B 33/047; E21B 33/10; E21B
33/1292; E21B 33/134; E21B 33/146;
E21B 41/0007; E21B 43/013; E21B
43/36; E21B 43/40; E21B 47/001; E21B
47/06; E21B 17/028; E21B 17/085; E21B
17/1028; E21B 17/1078; E21B 19/004;
E21B 21/01; E21B 23/08; E21B 23/10;
E21B 33/05; E21B 33/165; E21B 34/045;
E21B 34/066; E21B 34/12; E21B 34/16;
E21B 41/08; E21B 43/045; E21B 47/005;
E21B 47/13; E21B 47/14; E21B 17/06;
E21B 19/00; E21B 19/10; E21B 19/24;
E21B 21/06; E21B 21/066; E21B 21/085;
E21B 2200/01; E21B 23/02; E21B 28/00;
E21B 29/002; E21B 29/06; E21B 29/12;
E21B 33/00; E21B 33/03; E21B 33/0375;
E21B 33/0385; E21B 33/06; E21B
33/127; E21B 33/1293; E21B 34/02;
E21B 34/08; E21B 37/00; E21B 3/00;
E21B 41/00; E21B 43/0135; E21B
43/101; E21B 43/11; E21B 43/112; E21B
43/116; E21B 43/1185; E21B 43/128;
E21B 47/00; E21B 47/008; E21B 47/01;
E21B 47/017; E21B 47/095; E21B
47/117; E21B 47/26; E21B 4/02; E21B
7/00; E21B 7/18
USPC .............................................. 174/377, 77 R
See application file for complete search history.

(56) References Cited

U.S. PATENT DOCUMENTS

| | | | | |
|---|---|---|---|---|
| 3,614,295 A * | 10/1971 | Gillemot | ............ | H02G 15/043 |
| | | | | 174/87 |
| 3,879,575 A * | 4/1975 | Dobbin | ................ | H02G 15/18 |
| | | | | 174/92 |
| 4,736,071 A * | 4/1988 | Hawkins | ............. | G02B 6/4447 |
| | | | | 156/48 |
| 5,140,746 A * | 8/1992 | Debbaut | ................ | H01B 17/60 |
| | | | | 174/76 |
| 5,763,835 A * | 6/1998 | Huynh-Ba | ........... | G02B 6/4446 |
| | | | | 174/138 F |
| 5,777,268 A * | 7/1998 | Allen | ........................ | H01R 4/22 |
| | | | | 174/74 A |
| 6,265,665 B1 * | 7/2001 | Zahnen | .................... | H01R 4/70 |
| | | | | 174/70 A |
| 6,627,818 B2 * | 9/2003 | Kamel | ..................... | H01R 4/22 |
| | | | | 174/77 R |
| 6,730,847 B1 * | 5/2004 | Fitzgerald | ................ | H01R 4/22 |
| | | | | 174/77 R |
| 7,109,423 B1 * | 9/2006 | Bukovnik | ................ | H01R 4/22 |
| | | | | 174/77 R |
| 7,256,348 B1 * | 8/2007 | Endacott | ................ | H01R 4/183 |
| | | | | 174/840 |
| 7,378,593 B2 * | 5/2008 | Bukovnik | ................ | H01R 4/22 |
| | | | | 174/77 R |
| 7,572,979 B2 * | 8/2009 | Otsuki | ............... | H01R 13/5213 |
| | | | | 174/84 R |
| 7,834,268 B2 * | 11/2010 | Ootsuki | ............. | H02G 15/1806 |
| | | | | 174/74 R |
| 8,178,783 B2 * | 5/2012 | Yaworski | ............. | H02G 15/003 |
| | | | | 174/92 |
| 8,209,855 B2 | 7/2012 | Hilberts | | |
| 8,227,696 B2 * | 7/2012 | Pullium, III | ......... | H02G 15/003 |
| | | | | 174/92 |
| 8,323,058 B2 * | 12/2012 | Flaherty | ............. | H01R 13/6277 |
| | | | | 439/680 |
| 8,637,774 B2 * | 1/2014 | Hiner | ....................... | H01R 4/70 |
| | | | | 174/138 F |
| 8,732,946 B2 | 5/2014 | Harmason | | |
| 9,147,961 B2 * | 9/2015 | King, Jr | ............ | H01R 13/5216 |
| 9,673,558 B2 | 6/2017 | Frey | | |
| 9,696,509 B2 | 7/2017 | Kimbrell | | |
| 10,314,111 B2 * | 6/2019 | Barfuss | ................ | B60N 2/5685 |
| 10,541,478 B1 * | 1/2020 | King, Jr | ............... | H01R 4/2433 |
| 10,840,615 B2 * | 11/2020 | Newman | .............. | H01R 13/582 |
| 2002/0066588 A1 * | 6/2002 | King, Jr. | .................. | H01R 4/22 |
| | | | | 174/87 |
| 2003/0032321 A1 * | 2/2003 | Wertz | ................. | H01R 13/5219 |
| | | | | 439/282 |
| 2005/0164547 A1 * | 7/2005 | Sakaguchi | ............... | H01R 4/70 |
| | | | | 439/521 |
| 2007/0146114 A1 * | 6/2007 | Nelson | .................... | H01C 13/02 |
| | | | | 338/195 |
| 2010/0065302 A1 * | 3/2010 | Nesbitt | ................. | E21B 17/028 |
| | | | | 174/116 |
| 2011/0240088 A1 * | 10/2011 | Ecob | ....................... | B29C 45/00 |
| | | | | 136/244 |
| 2013/0309903 A1 * | 11/2013 | Iio | ....................... | H01R 13/5216 |
| | | | | 439/523 |

OTHER PUBLICATIONS

International Search Report and Written Opinion dated Oct. 15, 2020 in corresponding PCT Application No. PCT/US20/51434.

\* cited by examiner

SYSTEMS AND METHODS FOR SUBSEA WIRING SPLICES

TECHNICAL FIELD

Embodiments of the subject matter disclosed herein generally relate to oil and gas tools, and in particular to improved techniques for forming electrical connections between oil and gas tools.

BACKGROUND

Offshore oil and gas operations may utilize components that are positioned in a subsea environment, such as at a sea floor. These components may transmit or receive instructions through electrical connections. Due to the pressure and temperature of the subsea environment, specialty connectors may be utilized. These connectors may be expensive and limit a total number of connections in the subsea environment. As a result, subsea operations may have increased costs or may utilize complicated wiring schemes in order to accommodate each component.

SUMMARY OF THE INVENTION

In accordance with one or more embodiments, a subsea wiring apparatus includes a housing having a cavity extending from a first end to a second end. The apparatus also includes an electrical connector arranged within the cavity, the electrical connector receiving at least one conductor. The apparatus further includes a separator extending at least partially into the cavity, wherein the separator receives the at least one conductor and directs the at least one conductor into a passage. The apparatus also includes an isolating material within the cavity, the isolating material extending from the first end to the second end, wherein the isolating material surrounds at least a portion of the conductor to block fluid communication with the conductor.

In accordance with another embodiment, a subsea wiring apparatus includes a housing having an open first end and a closed second end. The apparatus also includes a plurality of wires extending into the housing, each wire of the plurality of wires including a first wire end and a second wire end. The apparatus further includes an electrical connector receiving a respective second wire end of each wire of the plurality of wires. The apparatus also includes a separator arranged at the first end of the housing, the separator including a plurality of passages, wherein at least a portion of each wire of the plurality of wires is arranged in a separate passage of the plurality of passages. The apparatus includes an isolating material within the housing, the isolating material surrounding at least a portion of each wire and at least a portion of the electrical connector.

In accordance with another embodiment, a method for forming a subsea wiring apparatus includes inserting a plurality of wires into an electrical connector. The method also includes forming an electrical connection between the plurality of wires, via the electrical connector. The method further includes arranging the electrical connection within an internal cavity of a housing. The method also includes installing isolating material within the internal cavity.

BRIEF DESCRIPTION OF THE DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

Figure 1:
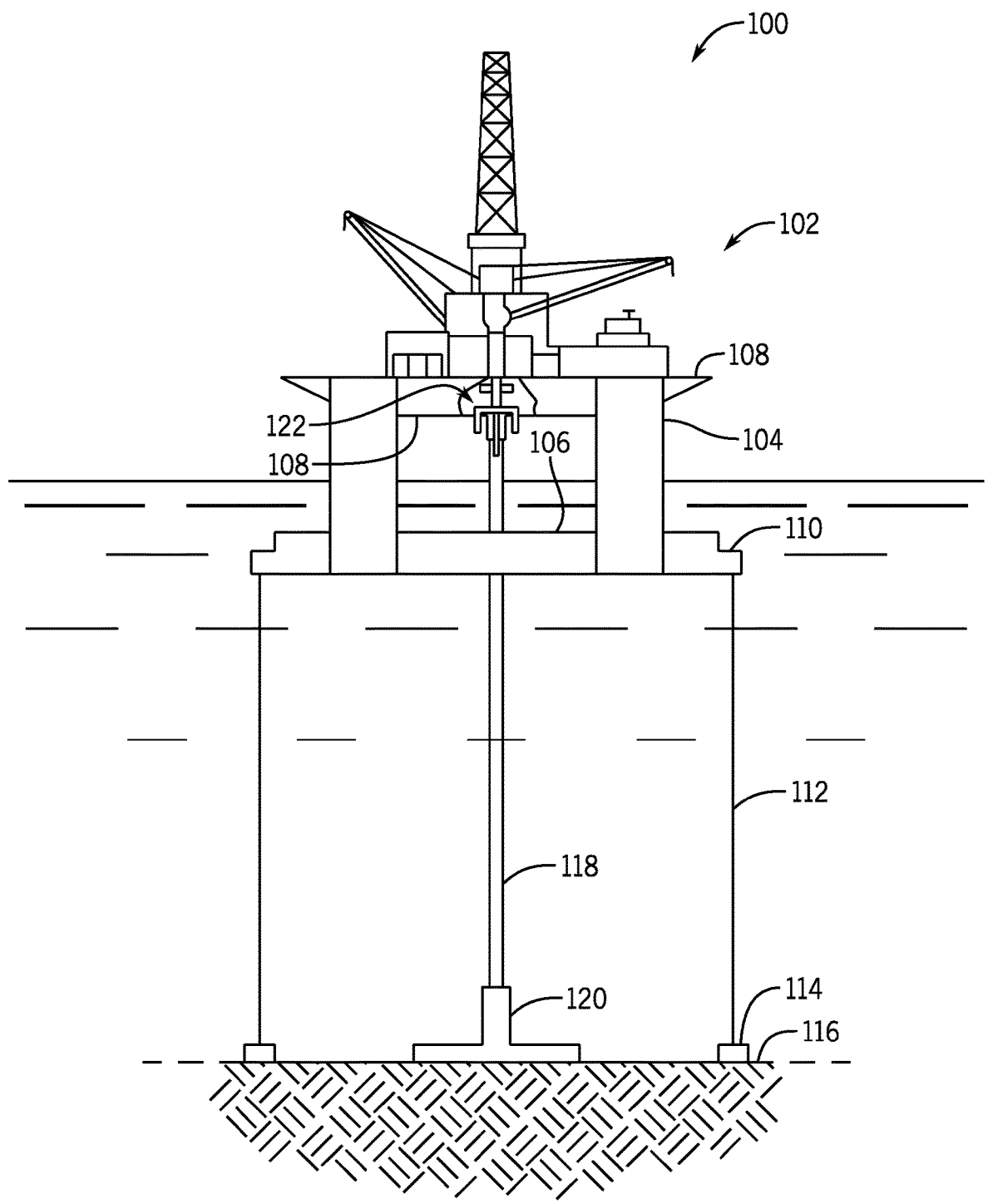
FIG. 1 is a schematic side view of an embodiment of an offshore oil and gas operation structure, in accordance with some embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include systems and methods for forming a wiring apparatus that may be used in a subsea environment, among other locations. Subsea environments may be exposed to extreme temperatures and pressures and may utilize specialty connectors to form electrical connections between different components. These specialty connectors may be costly and take up space. Embodiments of the present disclosure are directed toward a single, unitary wiring apparatus that enables multiplication of an existing circuit in a compact design while still enabling operation in subsea or other harsh environments. In various embodiments, the wiring apparatus may insulate a splice utilized to multiply an existing circuit. The splice may be arranged within a housing that is filled with an isolating material, such as potting, to protect the splice from the pressures, temperatures, and external forces of a subsea environment (or other harsh environment). As a result, ingress of fluids such as oils and seawater may be reduced or eliminated to provide a more robust and reliable wiring apparatus. Additionally, in embodiments, the splice may be mechanically protected and dampened from external forces due to the use of the isolating material. High pressure applications, such as those associated with a subsea environment, may push or drive fluid inside of wire insulation, which may generate high pressure spots at the terminating ends that could damage equipment or present other problems. These pressure spots may be hard to detect. However, embodiments of the present disclosure may use the isolating material to block ingress of the high pressure fluid into the insulation of the wire. Additionally, embodiments of the present disclosure enable circuit multiplication to reduce a total number of circuits and connectors within the system, which may reduce costs.

FIG. 1 is a schematic side view of an embodiment of an exploration and production system 100 including a floating platform 102 (e.g., platform), which may be arranged in a variety of configurations. In the illustrated embodiment, the platform 102 is a tension leg platform having a plurality of columns 104. The platform 102 is shown with four vertical columns 104, one at each corner, but it should be appreciated that a different number of columns 104, such as three, may also be utilized in various embodiments. Horizontal pontoons 106 extend between the columns 104. It should be appreciated that the columns 104 and the pontoons 106 may be hollow to provide buoyancy and are adapted to be selectively ballasted with seawater. The platform 102 of FIG. 1 further includes one or more decks 108 for supporting a variety of equipment for offshore drilling and production.

The platform 102 also includes upper tendon supports 110 at each corner. In the illustrated embodiment, each upper tendon support 110 is located on an end of one of the horizontal pontoons 106. In various embodiments, four elongate tendons 112 have upper ends supported at each tendon support 110. Accordingly, the platform 102 with four corners would have eight to sixteen separate tendons 112. The lower end of each tendon 112 is secured to a piling 114, shown set on a sea floor 116. A riser 118 is illustrated extending from a subsea wellhead 120 through an opening in one of the decks 108. The riser 118 can be a production riser with a production tree 122 located at an upper end of the riser 118 for controlling well fluid flowing upward from the riser 118. Alternatively, the riser 118 may be a drilling riser through which a drill string extends for drilling a well. If surface Christmas trees are employed, a number of production risers 118 can extend parallel to each other from the sea floor to the floating platform 102, each riser 118 being connected to a separate wellhead. Alternately, subsea trees could be employed. Although moored, the floating platform 102 may move relative to the riser 118 in response to sea current and wave motion. A riser tensioner assembly may be located on one of the decks 108 and provides tension to the riser 118 throughout the movement of the floating platform 102.

During drilling or production operations, various components may be arranged in a subsea environment, such as at the sea floor 116 or associated with the wellhead 120. These components may utilize information or instructions that are transmitted via electric circuits. The subsea environment may be subject to high pressures and various temperature ranges, and as a result, specialty connectors may be utilized, which are expensive. It may be desirable to utilize a compact, single solution to enable splicing of an electrical circuit that may withstand the unique challenges presented by a subsea environment. Accordingly, embodiments of the present disclosure include a wiring apparatus that utilizes a housing or cup to secure an electrical connector, such as a splice, within a pressure containing, isolating material that can withstand the pressure and temperature of the subsea environment. In various embodiments, a splice, such as a crimp splice, is arranged within the housing and receives one or more wires within designated regions of the crimp splice. The housing may then be filled with the isolating material, which may be a potting material, which substantially surrounds the insulation of the wires, thereby blocking or otherwise preventing fluid ingress into the insulation and along the conductive portions of the wires. Accordingly, the wiring apparatus may be used in place of, or along with, specialty connectors in the subsea environment to enable multiple wires to splice into a single circuit.

Figure 2:
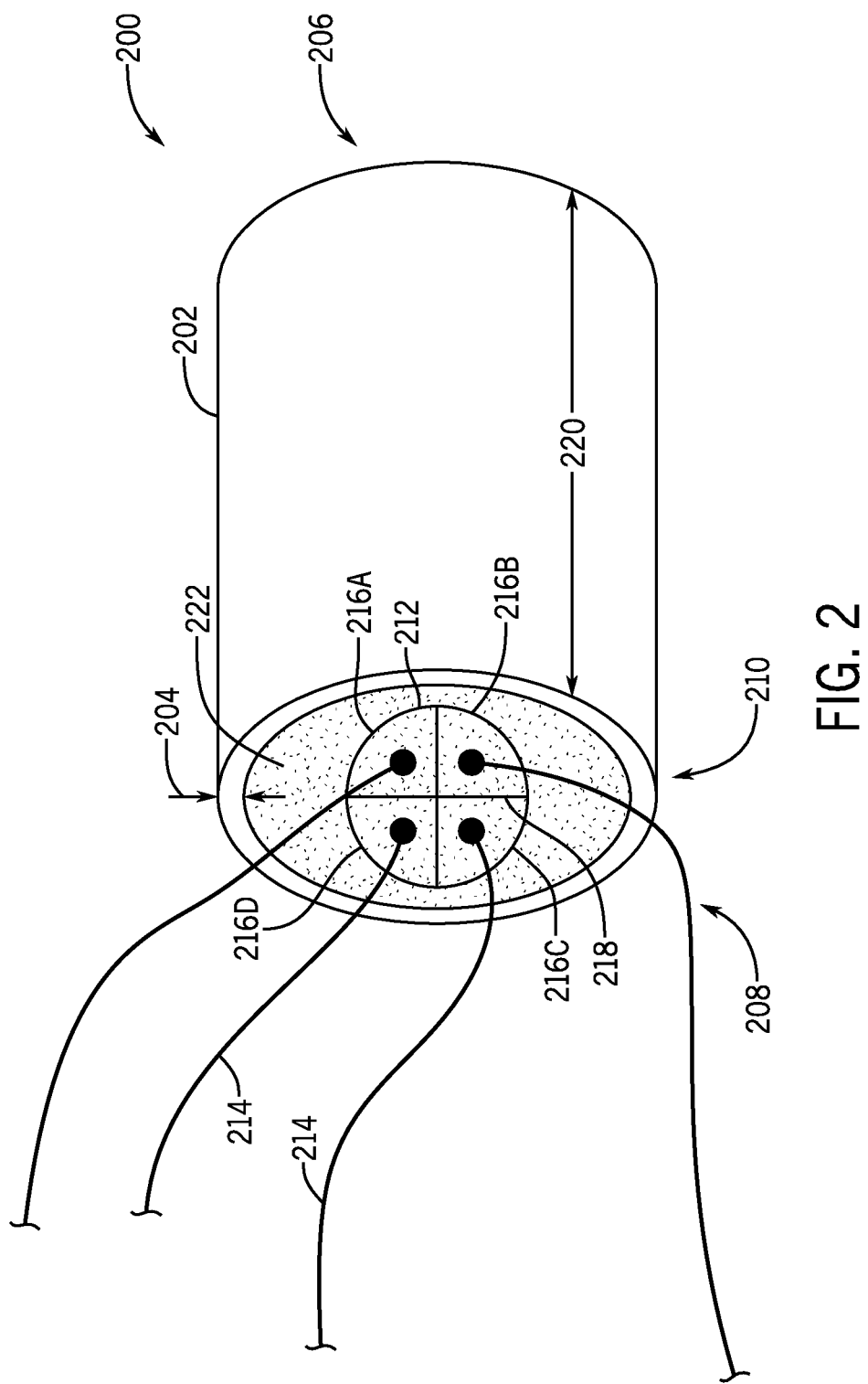
FIG. 2 is a front perspective view of an embodiment of a wiring apparatus, in accordance with embodiments of the present disclosure.

FIG. 2 is a front perspective view of an embodiment of a wiring apparatus 200, which may also be referred to as a wiring harness or subsea wiring harness. The illustration embodiment includes a housing 202, which is cylindrical. It should be appreciated that the housing 202 may be a variety of other shapes, such as square, rectangular, oval, etc., but that in various embodiments a cylindrical housing may be advantageous in terms of pressure containing or resisting capabilities. The housing 202 includes a wall thickness 204. The wall thickness 204 may be particularly selected for the expected temperature and/or pressure of the subsea environment. For example, the wall thickness 204 may be exposed to approximately 5000 pounds per square inch (psi) (approximately 34,473 kPa). The housing 202 is substantially hollow and may have a sealed end 206 and an open end 208. A cavity 210 extends from the open end 208 to the sealed end 206 and may receive one or more components of the wiring apparatus 200 described below.

In the illustrated embodiment, the wiring apparatus 200 further includes a separator 212, which may be a wedge cone, to substantially separate or isolate individual wires 214 from one another. For example, the separator 212 of the illustrated embodiment includes four passages 216A-216D separated by walls 218 that may prevent or otherwise block the wires 214 from crossing or interacting within the cavity 210. In certain embodiments, the separator 212 may only extend a portion of a length 220 of the housing 202. In other embodiments, the separator 212 may extend to a splice arranged within the housing 202. It should be appreciated that the illustrated separator 212 is provided as an example and that other configurations may be utilized with embodiments of the present disclosure. For example, there may be more or fewer passages 216. Additionally, the separator 212 may not be substantially circular and may be linear or a combination thereof. Furthermore, in embodiments, the separator 212 may be an integral portion of the housing 202 or may be an insert installed within the housing 202. Additionally, it should be appreciated that other configurations may be utilized to separate the wires 214. For example, a wedge cone may be utilized where the wires 214 are around along an outer surface of the wedge cone, which may include passages or tracks for the wires 214, among other options.

In embodiments, the cavity 210 is filled with isolating material 222, which may also be referred to as potting or barrier material, to surround the components arranged within the cavity 210. For example, the cavity 210 and isolating material 222 may insulate the components from fluid (e.g., oil, saltwater, etc.) surrounding the wiring apparatus 200 in the subsea environment. In various embodiments, the isolating material 222 may be degassed when introduced into the cavity 210 to eliminate air bubbles and the like to form a seal around the components arranged within the cavity 210. As a result, an insulating layer of the wires 214 may be isolated from the fluid, which prevents fluid from intruding into the insulation toward the conductive elements of the wires 214. Accordingly, pressure differences within the wires 214 may be reduced or eliminated, leading to improved operations of the wiring apparatus. In the illustrated embodiment, the isolating material 222 is also arranged within the separator 212, but it should be appreciated that in certain embodiments, various portions may not include the isolating material 222.

Figure 3:
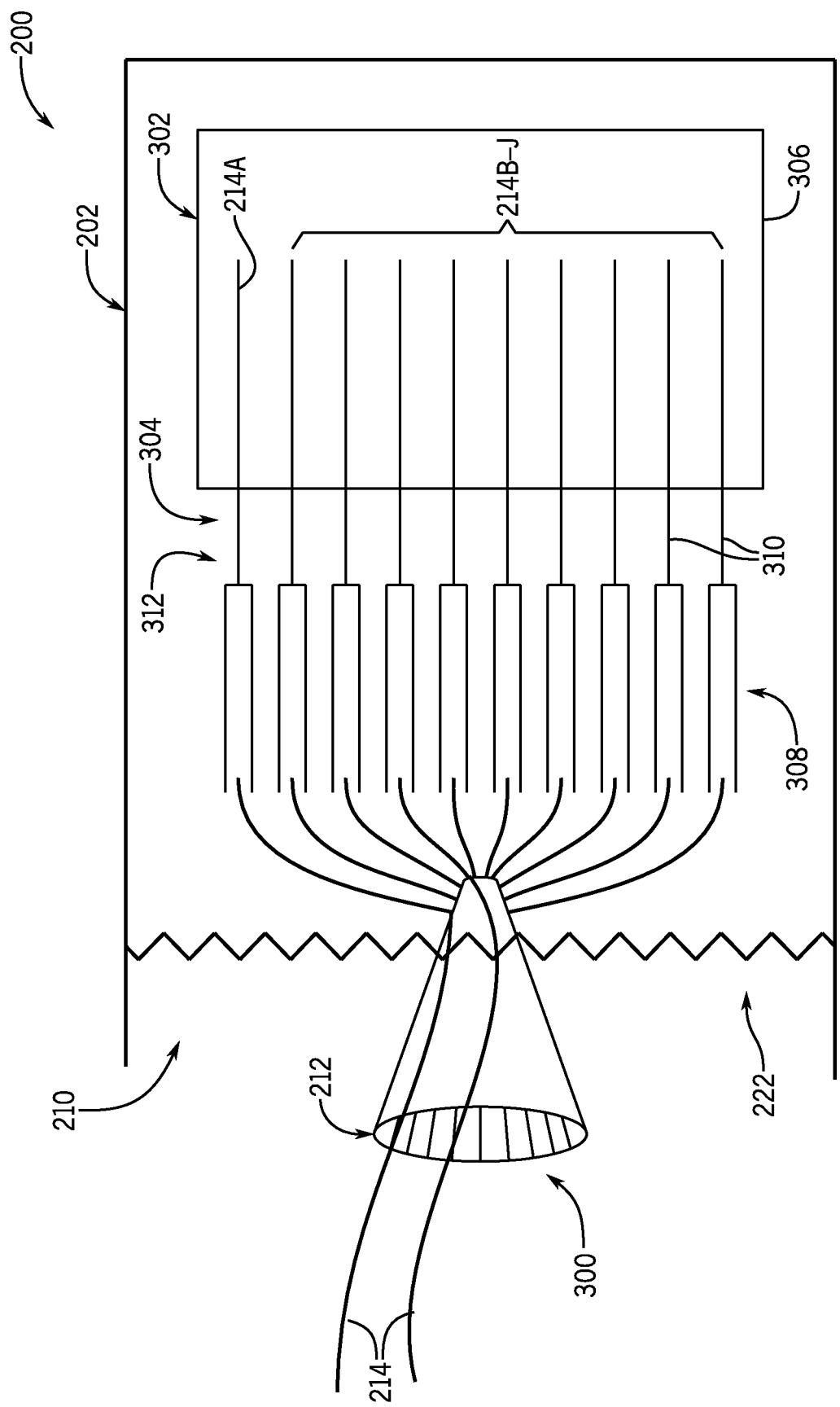
FIG. 3 is a cross-sectional side view of an embodiment of a wiring apparatus, in accordance with embodiments of the present disclosure.

FIG. 3 is a schematic cross-sectional view of an embodiment of the wiring apparatus 200. The illustrated embodiment includes the housing 202 that receives the wires 214 via the separator 212, which is illustrated as a wedge cone in the illustrated embodiment. The wires 214 are arranged along an outer surface 300 of the wedge cone. As a result, the wires 214 are separated from one other. In various embodiments, channels or pathways may be formed along the outer surface 300 to further separate the wires 214 from one other. For clarity, only two of the wires 214 are illustrated along the outer surface 300. In embodiments, the separator 212 may be an additional component installed within the housing 202 or forming at least a portion of the housing 202. For example, in embodiments, the separator 212 may be an integral portion of an interior wall of the housing 202 that extends radially inward.

In various embodiments, the wiring apparatus 200 includes an electrical connector 302, which in the illustrated embodiment is a crimp splice. It should be appreciated that the electrical connector 302 may be any type of connector that is utilized to terminate wires or connect one wire to another. By way of example only, the electrical connector 302 may be a splice crimp, a butt splice, a parallel crimp, or any other type of uninsulated crimp splice. In various embodiments, an uninsulated portion 304 of the various wires 214 may be installed within a body 306 of the electrical connector 302. The body 306 may then be compressed to enable electrical communication between the wires 214. By way of example only, a first wire 214A may be considered an input while other wires, such as wires 214B-214J, are considered outputs. As a result, the circuit in the illustrated embodiment may enable nine outputs with only a single input connection, which may reduce a total number of subsea connections formed. The reduction in connections may reduce costs.

In the illustrated embodiment, the wires 214 include the uninsulated portion 304 and an insulated portion 308. In traditional systems, fluids in the subsea environment may be at high pressures and may migrate toward conductors 310 of the wires 214. As a result, pressure may be established within the wires 214, which is undesirable. However, embodiments of the present disclosure include the isolating material 222, which insulates the electrical connector 302 and associated areas of the wire 214 from the pressures and temperatures of the subsea environment. For example, in the illustrated embodiment, the isolating material 222 is positioned to surround the electrical connector 302 and is also at a transition 312 between the insulated portion 308 and the uninsulated portion 304. As a result, fluid migration between the insulation toward the conductors 310 may be reduced. Furthermore, the isolating material 222 provides protection for the electrical connector 302, for example, due to outward forces that may be present in the subsea environment. Additionally, the isolating material 222 may provide dampening to reduce the effects of shock and vibration.

Figure 4A:
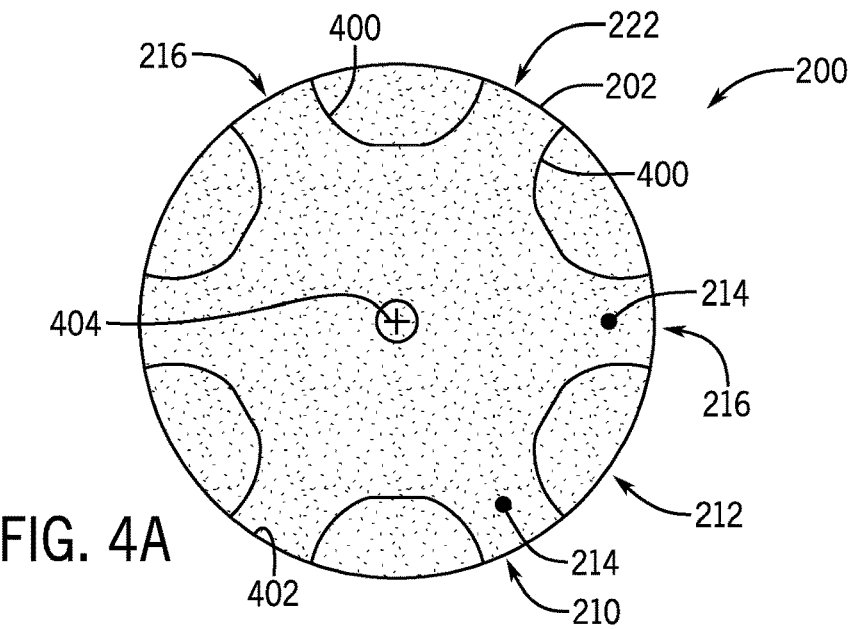
FIGS. 4A and 4B are schematic side views of an embodiment of a separator of a wiring apparatus, in accordance with embodiments of the present disclosure.
Figure 4B:
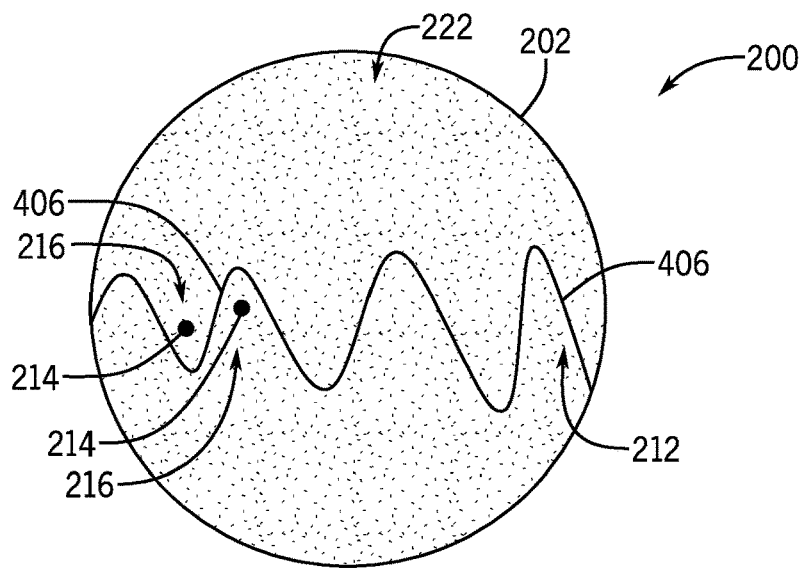

FIGS. 4A and 4B are side views of embodiments of the wiring apparatus 200 illustrating embodiments of separator configurations. As described above, in various embodiments the separator 212 may include materials that isolate or generate space between individual wires 214. For example, the separator 212 may include the passages 216 illustrated in FIG. 2 to separate the wires 214. In various embodiments, the separator 212 may be formed directly into the housing 202, for example as a radial extension or the like, or may be an insert installed within the housing 202. The embodiment illustrated in FIG. 4A includes the extensions 400 arranged along an inner wall 402 and extending radially inward toward an axis 404. The extensions 400 form the space between the passages 216 that enable individual wires 214 to be installed without crossing or contacting one another. As a result, the isolating material 222 may be positioned within the cavity 210 to surround and isolate the wires 214 from the pressure and temperature of the subsea environment. In the illustrated embodiment, the extensions 400 have rounded edges, which may reduce the likelihood of catching or damaging the wires 214. However, it should be appreciated that the extensions 400 may have a variety of shapes, such as substantially equal, triangular, and the like. Furthermore, in various embodiments, the extensions 400 may contact one another, for example, via connecting bars and the like. As described above, the extensions 400 may be utilized to form the passages 216 which may extend substantially to the electrical connector 302 or along a portion of the length 220 of the housing 202.

The embodiment of FIG. 4B illustrates the separator 212 that is an insert installed within the cavity 210. The illustrated separator 212 includes the passages 216 separated by the walls 406. The walls 406 may be utilized as the space between the wires 214. It should be appreciated that any number of passages 216 may be generated in FIGS. 4A and 4B. That is, there may be any number of extensions 400 or walls 406. In this manner, the wires 214 installed within the wiring apparatus 200 and utilized with the electrical connector 302 may be separated at the open end 208 using one or more separators 212.

The illustrated embodiments do not block or otherwise impede the isolating material 222 from filling at least a portion of the cavity 210. For example, the isolating material 222 may be arranged to extend and flow into the passages 216, where the wires 214 may be surrounded to block ingress of fluids between the conductors 310 and the insulation. It should be appreciated that the isolating material 222 may be formed from a variety of different material types, such as thermosetting plastics, silicon rubber gels, epoxy resins, and the like. In various embodiments, the isolating material 222 may be selected based on the insulation of the wires 214 utilized with the wiring apparatus 200.

Figure 5:
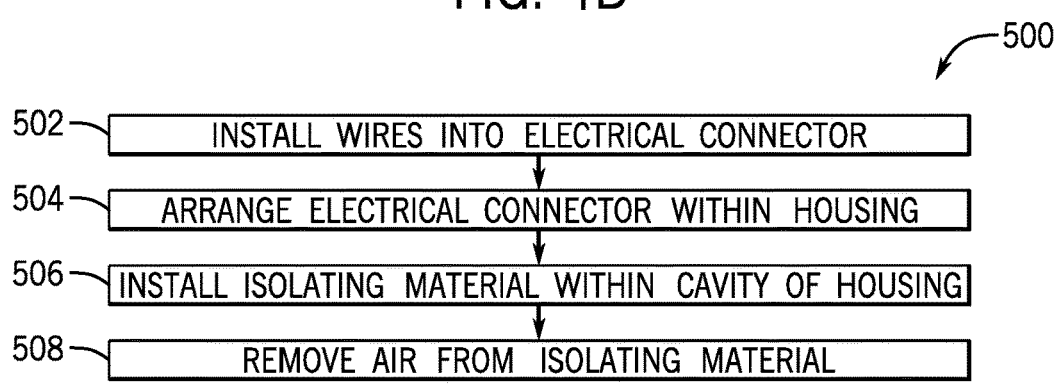
FIG. 5 is flow chart of an embodiment of a method for forming a wiring apparatus, in accordance with embodiments of the present disclosure.

FIG. 5 is a flow chart of an embodiment of a method 500 for forming a wiring apparatus. It should be appreciated that the method may include additional or fewer steps. Additionally, the steps may be performed in a different order or in parallel. By way of example, wires may be installed within an electrical connector 502. For example, an uninsulated end of a wire may be arranged within a body of a splice with uninsulated ends of other wires. The splice may then be compressed to form a connection between the wires. The electrical connector may be arranged within a housing 504. The housing may include a cavity for receiving the splice. In various embodiments, the wires extending from the splice may be routed or otherwise guided through passages to provide separation between the wires within the cavity. The cavity may be filled with isolating material 506. For example, an epoxy of thermosetting plastic may flow into the cavity and substantially surround the splice and the individual wires. As described above, in various embodiments the isolating material may block ingress of fluid between wire insulation and the conductor. Air may be removed from the isolating material 508. In various embodiments, air is removed during the installation process. In other embodiments, produces such as degassing and the like may be used. Thereafter, the isolating material may set or cure, thereby preparing the wiring apparatus for use.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A subsea wiring apparatus, comprising:
    a housing having a cavity extending from a first end to a second end, the housing configured to withstand subsea pressures;
    an electrical connector arranged within the cavity, the electrical connector receiving at least one conductor,
    a separator extending at least partially into the cavity, wherein the separator receives the at least one conductor and directs the at least one conductor into a passage, the separator arranged at the first end and receiving the at least one conductor before the electrical connector; and
    an isolating material within the cavity, the isolating material extending from the first end to the second end, wherein the isolating material surrounds at least a portion of the at least one conductor and surrounds at least a portion of the electrical connector, to block fluid communication with the at least one conductor.

2. The subsea wiring apparatus of claim 1, wherein the electric connector is at least one of a crimp, a butt splice, or a parallel crimp.

3. The subsea wiring apparatus of claim 1, wherein the conductor forms at least a portion of a wire, the wire further comprising:
    insulation extending along at least a portion of the wire positioned within the cavity.

4. The subsea wiring apparatus of claim 3, wherein the isolating material blocks ingress of fluid between the conductor and the insulation.

5. The subsea wiring apparatus of claim 1, wherein the separator further comprises a plurality of passages, the plurality of passages separated by a plurality of walls, the subsea wiring apparatus further comprising:
    a plurality of conductors positioned within a body of the electrical connector, each conductor of the plurality of conductors comprising a first end and a second end, the respective second ends being arranged within the body and the respective first ends being arranged within respective individual passages of the plurality of passages.

6. The subsea wiring apparatus of claim 1, wherein the isolating material comprises at least one of a thermosetting plastic, a silicon rubber gel, or an epoxy resin.

7. The subsea wiring apparatus of claim 1, wherein the separator is integrally formed with the housing, further comprising:
    a plurality of extensions extending radially inward from the housing, the extensions forming barriers between a plurality of passages.

8. The subsea wiring apparatus of claim 1, wherein the separator is an insert installed within the cavity.

9. A subsea wiring apparatus, comprising:
    a rigid housing having an open first end and a closed second end;
    a plurality of wires extending into the housing, each wire of the plurality of wires including a first wire end and a second wire end;
    an electrical connector receiving a respective second wire end of each wire of the plurality of wires;
    a separator arranged at the first end of the housing, the separator including a plurality of passages, wherein at least a portion of each wire of the plurality of wires is arranged in a separate passage of the plurality of passages; and
    an isolating material within the housing, the isolating material surrounding at least a portion of each wire and at least a portion of the electrical connector.

10. The subsea wiring apparatus of claim 9, wherein each wire of the plurality of wires includes insulation surrounding a conductor, the insulation being removed from the second wire end of each wire.

11. The subsea wiring apparatus of claim 10, wherein a composition of the isolating material is selected at least in part on a composition of the insulation.

12. The subsea wiring apparatus of claim 10, wherein the isolating material blocks ingress of fluid between the conductor and the insulation.

13. The subsea wiring apparatus of claim 9, wherein the electric connector is at least one of a crimp splice, a butt splice, or a parallel crimp.

14. The subsea wiring apparatus of claim 9, wherein the isolating material comprises at least one of a thermosetting plastic, a silicon rubber gel, or an epoxy resin.

15. The subsea wiring apparatus of claim 9, wherein the separator is integrally formed into a body of the housing.

16. The subsea wiring apparatus of claim 9, wherein the separator is an insert positioned within the housing.

17. A method for forming a subsea wiring apparatus, comprising:
    inserting a plurality of wires into an electrical connector;
    forming an electrical connection between the plurality of wires, via the electrical connector;
    arranging the electrical connection within an internal cavity of a housing; and
    installing isolating material within the internal cavity to surround at least a portion of the electrical connector, the isolating material being degassed when introduced into the cavity.

18. The method of claim 17, further comprising:
    separating the plurality of wires, via a separator, arranged at an inlet of the housing.

19. The method of claim 17, further comprising:
    installing the subsea wiring apparatus to a subsea oil and gas component.

20. The method of claim 17, further comprising:
    selecting the isolating material based at least in part on a composition of an insulated portion of the plurality of wires.

\* \* \* \* \*